United States Patent
Lambert et al.

(10) Patent No.: US 11,808,204 B2
(45) Date of Patent: Nov. 7, 2023

(54) CIRCUIT FOR SUPPLYING FUEL TO AN AERONAUTICAL CRYOGENIC TURBOMACHINE AND ASSOCIATED METHOD

(71) Applicants: SAFRAN, Paris (FR); ARIANEGROUP SAS, Les Mureaux (FR)

(72) Inventors: Pierre-Alain Lambert, Moissy-Cramayel (FR); Hugo Pierre Mohamed Jouan, Moissy-Cramayel (FR); Samer Maalouf, Moissy-Cramayel (FR); Louis-Vianney Mabille De La Paumeliere, Vernon (FR); Carlos Alberto Cruz, Vernon (FR); Davide Duri, Vernon (FR)

(73) Assignees: SAFRAN, Paris (FR); ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/007,082

(22) PCT Filed: Jul. 21, 2021

(86) PCT No.: PCT/FR2021/051365
§ 371 (c)(1),
(2) Date: Jan. 27, 2023

(87) PCT Pub. No.: WO2022/023648
PCT Pub. Date: Feb. 3, 2022

(65) Prior Publication Data
US 2023/0243300 A1    Aug. 3, 2023

(30) Foreign Application Priority Data
Jul. 31, 2020   (FR) .................................. FR2008164

(51) Int. Cl.
*F02C 7/224* (2006.01)
*F02C 3/20* (2006.01)
(Continued)

(52) U.S. Cl.
CPC ................ *F02C 3/20* (2013.01); *F02C 7/224* (2013.01); *F02C 6/20* (2013.01); *F02C 7/14* (2013.01); *F02C 9/36* (2013.01); *F02C 9/40* (2013.01)

(58) Field of Classification Search
CPC ............... F02C 3/20; F02C 7/22; F02C 7/224
See application file for complete search history.

(56) References Cited

U.S. PATENT DOCUMENTS

| | | | | |
|---|---|---|---|---|
| 2012/0096869 A1* | 4/2012 | Kesseli | ..................... | F02C 3/20 60/39.461 |
| 2014/0000275 A1* | 1/2014 | Kesseli | ................... | F02C 7/224 60/734 |

(Continued)

FOREIGN PATENT DOCUMENTS

| | | |
|---|---|---|
| EP | 3483054 A1 | 5/2019 |
| FR | 2555666 A1 | 5/1985 |

(Continued)

OTHER PUBLICATIONS

International Search Report and Written Opinion issued in International Application No. PCT/FR2021/051365 dated Oct. 21, 2021 (13 pages).

*Primary Examiner* — William H Rodriguez
(74) *Attorney, Agent, or Firm* — Bookoff McAndrews, PLLC

(57) ABSTRACT

A fuel supply circuit for an aeronautical cryogenic turbomachine including: at least one cryogenic reservoir containing a liquid fuel topped with a boil-off gas and including a high-pressure liquid pump to supply at least one main propulsion device of the turbomachine with liquid fuel, an (Continued)

auxiliary turbomachine including an electric generator, a gas compressor to supply the auxiliary turbomachine with gaseous fuel, and a buffer gas reservoir connecting the gas compressor to the cryogenic reservoir to reinject gas into the cryogenic reservoir in order to maintain the pressure in the cryogenic reservoir above a predefined value, the electric generator supplying the high-pressure liquid pump and the gas compressor.

20 Claims, 1 Drawing Sheet

(51) Int. Cl.
  *F02C 7/14* (2006.01)
  *F02C 6/20* (2006.01)
  *F02C 9/40* (2006.01)
  *F02C 9/36* (2006.01)

(56) References Cited

U.S. PATENT DOCUMENTS

| | | |
|---|---|---|
| 2015/0300260 A1 | 10/2015 | Wollenweber |
| 2015/0330312 A1 | 11/2015 | Delgado et al. |

FOREIGN PATENT DOCUMENTS

| | | | |
|---|---|---|---|
| FR | 3113702 A1 | * | 3/2022 |
| FR | 3114355 A1 | * | 3/2022 |
| WO | WO-2021240106 A1 | * | 12/2021 |

* cited by examiner

[Fig. 1]
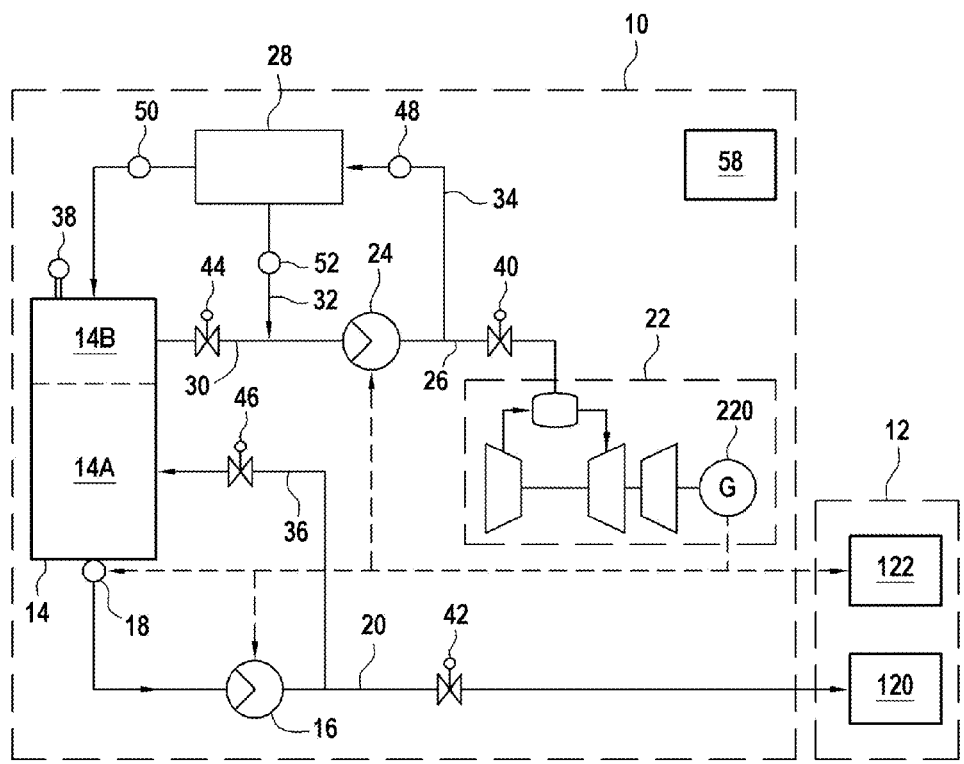
[Fig. 2]
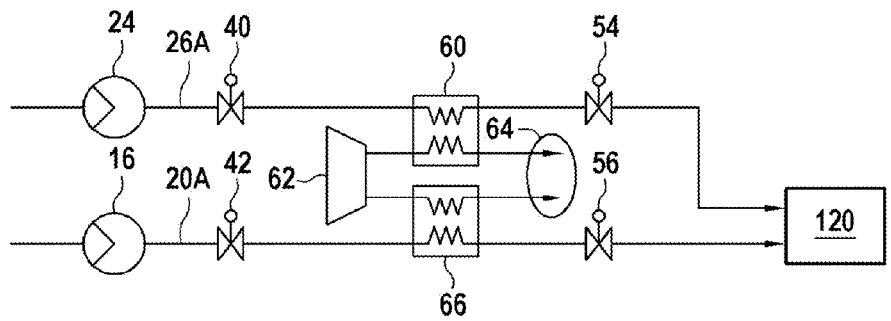

CIRCUIT FOR SUPPLYING FUEL TO AN AERONAUTICAL CRYOGENIC TURBOMACHINE AND ASSOCIATED METHOD

CROSS-REFERENCE TO RELATED APPLICATIONS

This patent application is a U.S. National Stage entry of International Application No. PCT/FR2021/051365, filed on Jul. 21, 2021, now published as WO 2022/023648 A1, which claims priority to FR 2008164, filed on Jul. 31, 2020.

TECHNICAL FIELD

This invention relates to the field of cryogenic propulsion and more specifically relates to a circuit for supplying liquid hydrogen to an aeronautical turbomachine.

PRIOR ART

Currently, in the aeronautical field and for reasons of bulk and weight of the reservoirs, known architectures for the propulsion of aircraft using cryogenic fuel make provision for a supply of cold liquid (between 20 K and 150 K according to the nature of the fuel) from a cryogenic reservoir with heat exchangers installed between the fuel and the air of the primary flow of the main propulsion device (particularly in the nozzle of this propulsion device), to bring the fuel to the temperature conditions required for injection into the combustion chamber. This heating is specifically necessary to guard against the risks of icing (in particular of the injectors) and to limit the quantity of energy drawn off the combustion chamber, if it has to heat the fuel with the conventional heat sources of an aircraft. However, these exchangers generate heavy load losses in the primary flow which by reducing the trust and energy efficiency reduce the energy efficiency of the main propulsion device.

In addition, since the thermal inputs external to the cryogenic reservoir are transferred to the liquid fuel, causing its vaporization, the thermal insulation of this reservoir which relies on dual vacuum-jacketed technology is burdensome and expensive since it aims to minimize the boil-off of the liquid fuel and the gas flow, generally very low, is then expelled into the ambient atmosphere via an overpressure valve, in the event of an excess of pressure in the reservoir.

Thus, to arrive at an acceptable trade-off in terms of cost, weight, reliability and performance, less effective insulations are used, which will lead to an increase, particular, in the flow of boil-off gas which it is then necessary to manage and in particular avoid ventilating to the outside for reasons of safety and fuel cost, or environmental impact in the case of specific fuels such as liquefied hydrocarbons.

A solution which is known but expensive and complex to implement is the re-condensation or re-liquefaction of this boil-off gas. Thus, a great need has been expressed for an alternative solution which is less expensive and easy to manage and implement.

SUMMARY OF THE INVENTION

This invention thus has the main aim of palliating these drawbacks by making provision for a turbomachine fuel supply circuit operating with a liquid fuel and the energy efficiency of which is improved by a conditioning of the boil-off gas, which is no longer thrown away since it represents weight, energy and money, to reinject it into the fuel supply circuit supplying the propulsion devices of the turbomachine. An aim of the invention is also to make it possible to use this gas to supply power to the pumps of the fuel supply circuit and to generate all the non-propulsive forms of power required by the aircraft. Another aim is to avoid losing this gas in boil-off over a great range of flows.

These aims are achieved by a liquid fuel supply circuit for an aeronautical cryogenic turbomachine including: at least one cryogenic reservoir containing a liquid fuel topped with a boil-off gas and including a high-pressure liquid pump connected to an outlet of said cryogenic reservoir to supply at least one main propulsion device of the turbomachine with liquid fuel, an auxiliary turbomachine including an electric generator and producing heat via its exhaust gases, a gas compressor mounted between the cryogenic reservoir and the auxiliary turbomachine to supply the auxiliary turbomachine with gaseous fuel, and a buffer gas reservoir connecting an outlet of the gas compressor to an inlet of the cryogenic reservoir to reinject gas into the cryogenic reservoir in order to maintain the pressure in the cryogenic reservoir above a predefined value, said electric generator electrical energy to said high-pressure liquid pump and said gas compressor.

Thus, the incorporation of an auxiliary turbomachine which consumes the boil-off gas and which, inserted into the liquid fuel supply circuit, makes it possible under any circumstances, by the presence of a buffer gas reservoir, to bleed both liquid and gas from the cryogenic reservoir, notably improves the efficiency of the aeronautical cryogenic turbomachine.

Preferably, the buffer gas reservoir is also connected to a gas duct connecting the cryogenic reservoir to the gas compressor to allow the starting of the auxiliary turbomachine from the buffer gas reservoir.

According to the envisioned embodiment, the fuel supply circuit of the main propulsion device may further include a first heat exchanger between the gaseous fuel at the outlet of the gaseous compressor and the exhaust gases of the auxiliary turbomachine. The gaseous fuel thus heated in the first heat exchanger is directed to the main propulsion device of the turbomachine to be mixed with the liquid fuel.

The supply circuit may also include a second heat exchanger between the liquid fuel at the outlet of the high-pressure liquid pump and the exhaust gases of the auxiliary turbomachine.

The supply circuit may also further include a channel connecting an outlet of the high-pressure liquid pump to an inlet of the cryogenic reservoir to reinject liquid into said cryogenic reservoir.

Advantageously, said liquid fuel is liquid hydrogen.

The invention also relates to an aeronautical cryogenic turbomachine including a liquid fuel supply circuit as mentioned above and an aircraft including at least one aeronautical cryogenic turbomachine.

The invention also relates to a fuel supply method for an aeronautical cryogenic turbomachine wherein a high-pressure liquid pump connected to an outlet of a cryogenic reservoir containing a liquid fuel topped by a boil-off gas supplies liquid fuel to at least one main propulsion device of the turbomachine, an auxiliary turbomachine including an electric generator produces heat via its exhaust gases, a gas compressor mounted between the cryogenic reservoir and the auxiliary turbomachine supplies gaseous fuel to the auxiliary turbomachine, and a buffer gas reservoir connecting an outlet of the gas compressor to an inlet of the cryogenic reservoir reinjects gas into the cryogenic reservoir in order to maintain the pressure in the cryogenic reservoir above a predefined value, said electric generator supplying electrical energy to said high-pressure liquid pump and said gas compressor.

Preferably, said electric generator also supplies electrical energy to non-propulsive power consumption sources.

BRIEF DESCRIPTION OF THE DRAWINGS

Other features and advantages of this invention will become apparent from the description given below, with reference to the appended drawings which illustrate an exemplary embodiment thereof without any limitation and on which:

FIG. 1 shows an example of a liquid fuel supply circuit in accordance with the invention, and FIG. 2 illustrates a variant, with a dual heat exchanger, of the supply circuit of FIG. 1.

DESCRIPTION OF THE EMBODIMENTS

FIG. 1 schematically shows a liquid fuel supply circuit 10, typically liquid hydrogen, of an aeronautical turbomachine 12.

As is known, this supply circuit includes one or more cryogenic reservoirs 14 containing a liquid fuel 14A topped by a boil-off gas 14B and at least one high-pressure liquid pump 16 connected to the cryogenic reservoir to supply the main propulsion devices 120 of the turbomachine 12 via a main liquid line 20. The high-pressure liquid pump 16 can be assisted to bleed the liquid fuel 14A by one or more feed pumps 18 submerged in the reservoir.

According to the invention, the supply circuit further includes an auxiliary turbomachine 22 known as PGU (Power Generation Unit) in the remainder of the description, installed near the reservoir and including one or more electric generators 220 (advantageously mounted on a free low-pressure shaft of the PGU) and producing heat via its exhaust gases, a gas compressor 24 mounted between the cryogenic reservoir 14 and the auxiliary turbomachine 22 to supply gas fuel via a main gas line 26 to the auxiliary turbomachine, and a buffer gas reservoir 28 connecting an outlet of the gas compressor 24 to an inlet of the cryogenic reservoir 14 to reinject gas into the cryogenic reservoir in order to maintain the pressure in the cryogenic reservoir above a predefined value (for liquid hydrogen typically 2 bars).

The electric generator or generators 220 are connected to the high-pressure liquid pump 16 (and to the feed pump or pumps 18 if present) and to the gas compressor 24 to supply them with electrical power and thus allow their operation. More precisely, this generator ensures the supply of energy for the compression of the gas flow, a part of which supplies the PGU with fuel, and the supply of energy to the liquid pump which pressurizes the liquid and which bleeds this liquid from the cryogenic reservoir. It thus ensures the supply of energy to the non-propulsive systems (loads 122) of the aircraft (avionics, actuators, cabin systems etc.).

The gaseous fuel delivered via the main gas line 26 at the outlet of the gas compressor 24 and with which the auxiliary turbomachine 22 operates comes either from the cryogenic reservoir 14 containing the boil-off gas 14B through a gas duct 30 connecting it to the gas compressor 24, or from the buffer gas reservoir 28 through another gas duct 32 opening into the gas duct 30 (a tapping made on the main gas line 26 opens into the buffer reservoir via a gas duct 34). This gaseous fuel (vaporized gas from the two reservoirs) produces mechanical energy converted into electricity using the generator 220 and heat via the exhaust gases.

A tap is made on the main liquid line 20 at the outlet of the high-pressure liquid pump 16 to reinject liquid via a channel 36, opening into the cryogenic reservoir 14, to allow the cooling of said pump and ensure its optimal operation over a wide range of flows. This reservoir also includes an overpressure valve 38 to guarantee any discharge of gas to the outside.

Of course, provision is made for various valves 40-56 and sensors (not illustrated) on these channels and ducts to ensure the control of liquid or gas flows are the control of a general control unit 58.

As illustrated in the variant embodiment of FIG. 2, provision can be made for a first heat exchanger 60 installed in the nozzle 62 of the PGU between the exhaust gases 64 of the PGU and the gaseous fuel flowing through a secondary gas line 26A resulting from a tapping of the main gas line 26 (or the main gas line 26 itself), to heat the gas.

The heated gas can also be mixed with the liquid cryogenic flow at the outlet of this first exchanger 60 to obtain a single hotter flow, which limits the length of the lines inside which the fuel is very cold and causes considerable thermomechanical stresses and risks of flow fluctuation in the transients, and risks of icing of the outside atmosphere.

Where applicable, provision can also be made for a second heat exchanger 66 also installed in the nozzle 62 of the PGU, but this time between these same exhaust gases and the liquid fuel flowing over the main liquid line 20, to directly heat the liquid flow, and thus to increase the temperature and thus reduce the number of very cold lines and the energy to be supplied at the propulsion device.

The operation of the supply circuit is as follows. The boil-off gas produced in the cryogenic reservoir 14 is evacuated from this reservoir in such a way as to maintain the pressure in the latter within an acceptable range, and compressed by the gas compressor 24 which supplies the PGU 22 via the main gas line 26 when it is required. The tapping done on this main gas line downstream of the gas compressor makes it possible to supply the buffer gas reservoir of compressed gas 28 which has a triple function. First of all, if the boil-off gas flow is insufficient, it makes it possible to reinject gas into the cryogenic reservoir 14 to maintain the pressure above the predefined value and supply the main gas line supplying the PGU long enough for the flow of the boil-off gas to regain a sufficient value. Next, this buffer reservoir 28 is used to store gas awaiting use. Finally, it is used to start the PGU 22 by injecting gas from this buffer reservoir into the PGU to start it. Once the PGU has started, the electrical and thermal power is available to supply the different loads provided and heat the gas needed to start the propulsion device 12. More precisely, the generator supplies the electricity needed to operate the gas compressor 24, feed pumps 18 (if present) and liquid 16 and non-propulsive loads 122. The flow supplying the PGU is regulated by the control unit 56 to supply the mechanical power required by the generator 220. The rest of the flow can be oriented to the propulsion devices 120 of the turbomachine by passing through the heat exchanger 60 with the exhaust gases of the PGU to increase its temperature. The liquid flow is computed in such a way as to meet the fuel requirements of the propulsion devices (engine flow=liquid flow+gas flow).

The liquid cryogenic fuel flow supplements the gas flow to supply the quantity of fuel required by the engine regulating system. This flow varies widely over a flight. However, the high-pressure liquid pump 16 can only operate in a restricted range of flows given its margin restrictions in terms of stability, overflow and cavitation.

The gaseous fuel flow depends on the thermal inputs and cannot be controlled. If the gas flow exceeds the needs of the PGU and the pressure in the buffer reservoir is less than the setpoint pressure of the gas buffer, a part of the gas flow is directed to the buffer reservoir. Next, the flow needed to supply the PGU is directed to this PGU which must supply the energy consumed by the compressors, pumps and other non-propulsive loads and, if there is any, the remainder of the gas flow is directed to the engines.

The buffer reservoir is used to pressurize the main reservoir. If the pressure in the main reservoir is less than its reference pressure, gas stored at high pressure is transferred from the buffer reservoir to the main reservoir until the reference pressure is regained.

At start-up, gas from the buffer reservoir is introduced into the main gas line to supply the PGU which can thus supply the pumps and heat the boil-off gas via the first heat exchanger at the nozzle.

With the invention, this auxiliary turbomachine operates by combustion of the gaseous fuel coming from a part of this boil-off gas and compressed before being injected into its combustion chamber. It produces mechanical power converted into electrical power which supplies the liquid pumps and the gas compressors, as well as the non-propulsive loads. The calories dissipated at its exhaust further contribute to heating the fuel of the supply network of the main propulsion device.

Thus, the boil-off gas is recovered and used to produce a sufficient quantity of gas to ensure the heating and compression of the fuel, and to supply the non-propulsive loads with electrical energy.

The invention claimed is:

1. A fuel supply circuit for an aeronautical cryogenic turbomachine including: at least one cryogenic reservoir containing a liquid fuel-topped with a boil-off gas and including a high-pressure liquid pump connected to an outlet of said cryogenic reservoir and intended to supply at least one main propulsion device of the turbomachine with liquid fuel, an auxiliary turbomachine including an electric generator and producing heat via its exhaust gases, a gas compressor mounted between the cryogenic reservoir and the auxiliary turbomachine to supply the auxiliary turbomachine with gaseous fuel, and a buffer gas reservoir connecting an outlet of the gas compressor to an inlet of the cryogenic reservoir to reinject gas into the cryogenic reservoir in order to maintain the pressure in the cryogenic reservoir above a predefined value, said electric generator supplying electrical energy to said high-pressure liquid pump and said gas compressor.

2. The fuel supply circuit as claimed in claim 1, wherein the buffer gas reservoir is also connected to a gas duct connecting the cryogenic reservoir to the gas compressor to allow the starting of the auxiliary turbomachine from the buffer gas reservoir.

3. The fuel supply circuit as claimed in claim 1, further including a first heat exchanger between the gaseous fuel at the outlet of the gas compressor and the exhaust gases of the auxiliary turbomachine.

4. A fuel supply circuit as claimed in claim 3, wherein the gaseous fuel thus heated in the first heat exchanger is intended to be directed to the main propulsion device of the turbomachine to be mixed with the liquid fuel.

5. The fuel supply circuit as claimed in claim 1, wherein it further includes a second heat exchanger between the liquid fuel at the outlet of the high-pressure liquid pump and the exhaust gases of the auxiliary turbomachine.

6. The fuel supply circuit as claimed in claim 1, further including a channel connecting an outlet of the high-pressure liquid pump to an inlet of the cryogenic reservoir to reinject liquid into said cryogenic reservoir.

7. The fuel supply circuit as claimed in claim 1, wherein said liquid fuel is liquid hydrogen.

8. An aeronautical cryogenic turbomachine including a fuel supply circuit as claimed in claim 1.

9. An aircraft including at least one aeronautical cryogenic turbomachine as claimed in claim 8.

10. A fuel supply method for an aeronautical cryogenic turbomachine wherein a high-pressure liquid pump connected to an outlet of a cryogenic reservoir containing a liquid fuel topped by a boil-off gas supplies liquid fuel to at least one main propulsion device of the turbomachine, an auxiliary turbomachine including an electric generator produces heat via its exhaust gases, a gas compressor mounted between the cryogenic reservoir and the auxiliary turbomachine supplies gaseous fuel to the auxiliary turbomachine, and a buffer gas reservoir connecting an outlet of the gas compressor to an inlet of the cryogenic reservoir reinjects gas into the cryogenic reservoir in order to maintain the pressure in the cryogenic reservoir above a predefined value, said electric generator supplying electrical energy to said high-pressure liquid pump and said gas compressor.

11. The fuel supply method as claimed in claim 10, wherein the electric generator also supplies electrical energy to non-propulsive power consumption sources.

12. The fuel supply circuit as claimed in claim 2, further including a first heat exchanger between the gaseous fuel at the outlet of the gas compressor and the exhaust gases of the auxiliary turbomachine.

13. The fuel supply circuit as claimed in claim 2, wherein it further includes a second heat exchanger between the liquid fuel at the outlet of the high-pressure liquid pump and the exhaust gases of the auxiliary turbomachine.

14. The fuel supply circuit as claimed in claim 2, further including a channel connecting an outlet of the high-pressure liquid pump to an inlet of the cryogenic reservoir to reinject liquid into said cryogenic reservoir.

15. The fuel supply circuit as claimed in claim 3, further including a channel connecting an outlet of the high-pressure liquid pump to an inlet of the cryogenic reservoir to reinject liquid into said cryogenic reservoir.

16. The fuel supply circuit as claimed in claim 4, further including a channel connecting an outlet of the high-pressure liquid pump to an inlet of the cryogenic reservoir to reinject liquid into said cryogenic reservoir.

17. The fuel supply circuit as claimed in claim 5, further including a channel connecting an outlet of the high-pressure liquid pump to an inlet of the cryogenic reservoir to reinject liquid into said cryogenic reservoir.

18. The fuel supply circuit as claimed in claim 2, wherein said liquid fuel is liquid hydrogen.

19. The fuel supply circuit as claimed in claim 3, wherein said liquid fuel is liquid hydrogen.

20. The fuel supply circuit as claimed in claim 4, wherein said liquid fuel is liquid hydrogen.

* * * * *